United States Patent
Yu et al.

(10) Patent No.: US 11,720,262 B2
(45) Date of Patent: *Aug. 8, 2023

(54) POWER MANAGEMENT BASED ON DETECTED VOLTAGE PARAMETER LEVELS IN A MEMORY SUB-SYSTEM

(71) Applicant: Micron Technology, Inc., Boise, ID (US)

(72) Inventors: Liang Yu, Boise, ID (US); William C. Filipiak, Northville, MI (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,389

(22) Filed: May 16, 2022

(65) Prior Publication Data

US 2022/0276793 A1 Sep. 1, 2022

Related U.S. Application Data

(63) Continuation of application No. 16/855,655, filed on Apr. 22, 2020, now Pat. No. 11,334,259.

(51) Int. Cl.
*G06F 3/06* (2006.01)
*G06F 18/214* (2023.01)

(52) U.S. Cl.
CPC .......... *G06F 3/0625* (2013.01); *G06F 3/0614* (2013.01); *G06F 3/0653* (2013.01); *G06F 3/0659* (2013.01); *G06F 3/0673* (2013.01); *G06F 18/214* (2023.01)

(58) Field of Classification Search
CPC .... G06F 3/0625; G06F 3/0614; G06F 3/0653; G06F 3/0659; G06F 3/0673; G09K 9/6256
See application file for complete search history.

(56) References Cited

U.S. PATENT DOCUMENTS

| | | |
|---|---|---|
| 9,329,986 B2 | 5/2016 | Li et al. |
| 10,497,451 B2 | 12/2019 | Jang et al. |
| 10,559,335 B2 | 2/2020 | Kim et al. |
| 2011/0173374 A1 | 7/2011 | Hobbet et al. |
| 2015/0143019 A1 | 5/2015 | Sankar et al. |
| 2018/0173447 A1 | 6/2018 | Chin et al. |
| 2018/0211695 A1 | 7/2018 | Gans et al. |

(Continued)

OTHER PUBLICATIONS

Webel, Tobias, et al. "Proactive power management in IBM z15." IBM Journal of Research and Development 64.5/6 (2020): 15-1. (Year: 2020).*

(Continued)

*Primary Examiner* — Nicholas J Simonetti
(74) *Attorney, Agent, or Firm* — Lowenstein Sandler LLP

(57) ABSTRACT

A request is received from a host system to execute a portion of a memory management operation associated with a memory cell of a plurality of memory cells of one or more memory devices. A voltage parameter level associated with execution of the portion of the memory management operation is identified. A determination is made that a comparison of the voltage parameter level with a voltage parameter level threshold satisfies a condition. A power management action is performed in response to the condition being satisfied.

20 Claims, 5 Drawing Sheets

(56) References Cited

U.S. PATENT DOCUMENTS

2019/0295606 A1   9/2019   Parry et al.

OTHER PUBLICATIONS

Wang, Yih, et al. "A 4.0 GHz 291 Mb voltage-scalable SRAM design in a 32 nm high-k+ metal-gate CMOS technology with integrated power management." IEEE Journal of Solid-State Circuits 45.1 (2009): 103-110. (Year: 2009).*
PCT Notification of Transmittal of the International Search Report and the Written Opinion of the International Searching Authority for PCT Application No. PCT/US2021/028495, dated Aug. 5, 2021, 11 pages.

* cited by examiner

US 11,720,262 B2

POWER MANAGEMENT BASED ON DETECTED VOLTAGE PARAMETER LEVELS IN A MEMORY SUB-SYSTEM

CROSS-REFERENCE TO RELATED APPLICATION

This application is a continuation of U.S. patent application Ser. No. 16/855,655, titled "Power Management Based on Detected Voltage Parameter Levels in a Memory Sub-system," filed on Apr. 22, 2020, the entire disclosure of which is incorporated herein by reference.

TECHNICAL FIELD

Embodiments of the disclosure relate generally to memory sub-systems, and more specifically, relate to power management based on detected voltage parameter levels in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
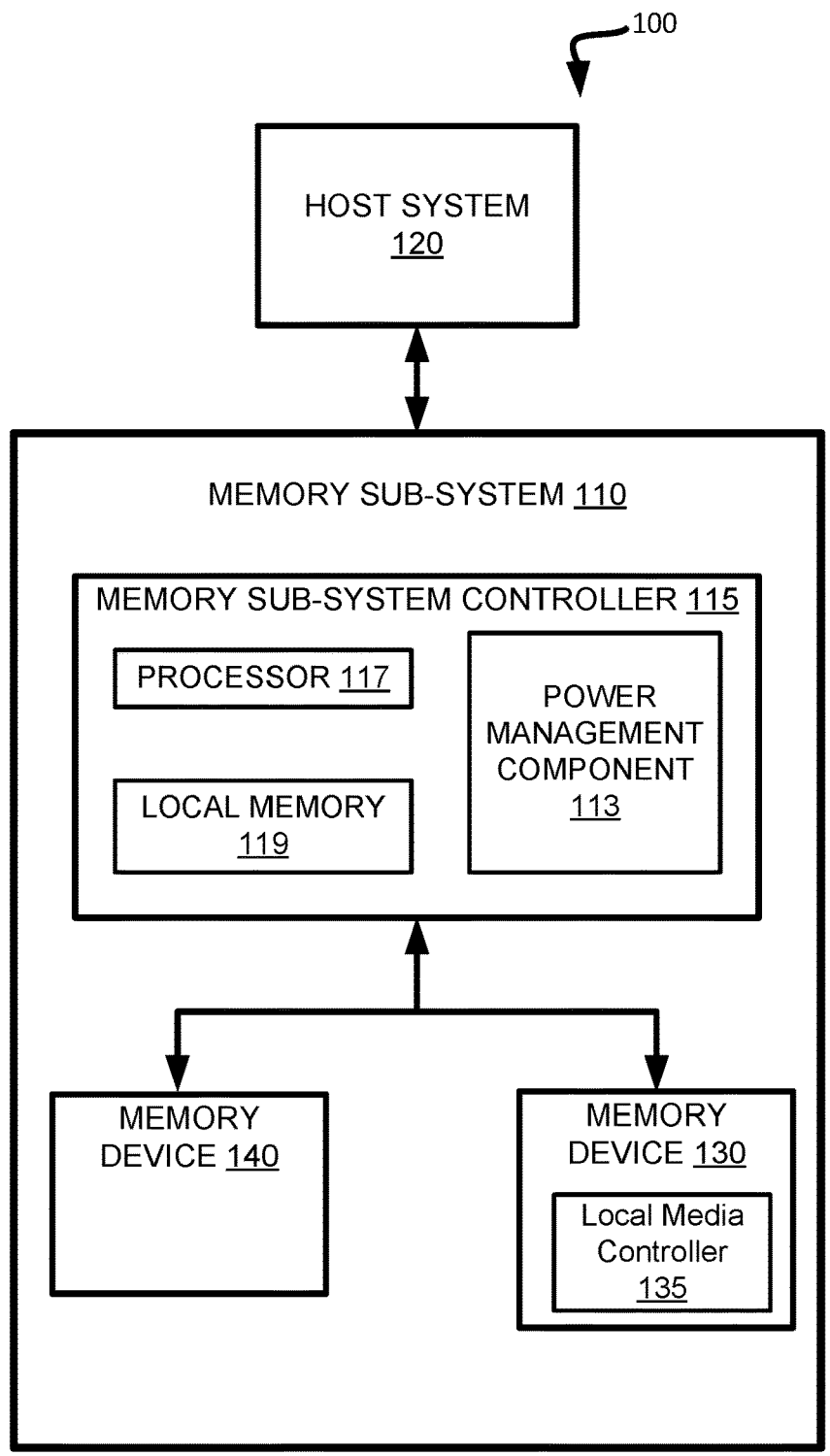
FIG. 1 illustrates an example computing system that includes a memory sub-system in accordance with some embodiments of the present disclosure.

Aspects of the present disclosure are directed to power management based on detected voltage parameter levels in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can perform multiple parallel operations (e.g., random reads, sequential reads, random writes, sequential writes, etc.) involving multiple memory devices having multiple memory dies. To perform a memory management operation (e.g., a read operation, program operation, erase operation, etc.), the memory sub-system can perform a respective set of sub-operations. For example, a read operation can be performed by measuring a threshold voltage of a memory cell to compare to a read voltage level to determine a stored data value. The parallel performance of multiple memory management operations involving multiple memory devices results in the consumption of higher current and higher peak power demands on a power supply which negatively impacts the stability and reliability of the data storage and data transmission. Furthermore, in an actual working environment, many applications or host systems cause significant changes in voltage parameters (e.g., voltage droop, voltage drop, etc.) due to a large peak current draw when multiple memory dies operate at the same time.

To address peak power issues resulting from overlapping operations, conventional memory devices employ a peak power budget to set a level or limit within which the multiple multi-die memory devices can operate during the execution of concurrent operations. However, this approach results in establishing of one pre-defined peak power performance level determined based on assuming worst case conditions or simulations during the characterization phase, which reduces the overall efficiency of the system. Accordingly, a controller in a conventional system is constrained by the pre-defined peak performance level and forced to limit the number of memory dies that can be active at a given time to perform parallel program, erase and read operations. Furthermore, the predefined peak power levels and corresponding limit on the number of active memory dies is established for a memory sub-system in a manner that is independent of the actual host system and corresponding power delivery network design. However, a same peak current or power level can cause different host systems and power delivery network designs having different operating parameters (e.g., impedance, frequency domain, etc.) to produce different voltage parameters during the execution of operations (e.g., read, program, erase, etc.). Accordingly, conventional power management systems cannot be configured to account for the aforementioned differences in power consumption in view of the disparate host system demands.

Aspects of the present disclosure address the above and other deficiencies by a memory sub-system that can issue a training command sequence to multiple memory dies of the memory sub-system. During this training phase, each memory die executes multiple memory management operations (e.g., read operations, program operations, erase operations, power testing operations) and determines a voltage parameter (e.g., voltage droop, etc.) corresponding respective portions of the memory management operations. For example, the set of memory management operations can include one or more of a read operation (e.g., a set of instructions to execute a set of sub-operations to perform a read operation), a program operation (e.g., a set of instructions to execute a set of sub-operations to perform a program operation), an erase operation (e.g., a set of instructions to execute a set of sub-operations to perform an erase operation), a peak power emulation operation (e.g., a set of instructions to cause one or more peak power or peak current draw events), etc.

During the training phase, each target memory die executes the set of memory management operations to cause one or more peak current draw events (e.g., one or more instances in which the memory die draws a current level that exceeds a peak current level threshold). A voltage parameter levels (e.g., a voltage droop value, a voltage drop value, etc.) are determined in connection with each of the peak current draw events. Each voltage parameter level (e.g., voltage droop value) is associated with a respective portion of the set of memory management operations. The voltage parameter level and information identifying the corresponding portion of the memory management operations that caused the voltage parameter level can be encoded (e.g., as a token) and stored. In an embodiment, a set of tokens is generated and stored for each memory die of the multiple memory dies, where each token represents a voltage parameter level associated with a peak current draw event and information identifying the corresponding portion of the command sequence that caused the voltage parameter level (e.g., a memory management operation portion). The controller of the memory sub-system can continue to issue the training command sequence to each memory die in turn until all of the memory dies of the memory sub-system complete the training phase.

In the training phase, the system can categorize portions of the memory management operations (e.g., one or more sub-operations of a memory management operation) in terms of a risk level (e.g., high risk or low risk) as a function of the associated voltage parameter level. For example, the power management component 113 can categorize memory management operation portions having a voltage parameter level that exceeds a voltage parameter level threshold as high risk.

Following the training phase, the system manages the power level consumption by the memory dies during execution of memory management operations initiated by a host system. To address power issues resulting from the execution of overlapping memory management operations by multiple memory dies operating in parallel, the system can read out the tokens generated during the training phase and perform one or more power management actions (e.g., pause execution of a memory management operation, delay execution of a memory management operation, switch a memory die to a low power mode, etc.)

Advantageously, the system according to embodiments of the present disclosure can determine voltage parameter levels during a training phase and, in connection with the execution of memory management operations initiated by a host system, use the voltage parameter levels information associated with peak current draw events to execute power management actions to manage the power consumed by the memory dies. Moreover, the in-system training phase can be performed for various host system designs and various power delivery networks. Accordingly, the system according to embodiments of the present disclosure performs power management actions that account for the design and requirements of a real or actual host system. This increases throughput capability and optimizes the execution of operations in view of an applicable power limit.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical block address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a power management component 113 to manage a training phase during which a training command sequence is issued to multiple memory dies of the memory sub-system. In an embodiment, the training command sequence can be initiated or issued by the memory sub-system controller 115. In an embodiment, the power management component 113 monitors the performance of a target memory die during the execution of a set of memory management operations associated with the training command sequence. Each memory management operation can include a set of sub-operations or functions related to the performance of one or more tasks or operations (e.g., read operations, program operations, erase operations, power testing simulation operations, etc.). In an embodiment, the power management component 113 sends the training command sequence to each memory die, in turn, until all of the memory dies have executed the set of memory management operations.

In an embodiment, the power management component 113 determines a voltage parameter level resulting from the execution of each portion of the memory management operations (also referred to as a "memory management operation portion"). In an embodiment, the voltage parameter level can be a voltage droop level (e.g., a loss of output voltage experienced as a result of driving a load). The memory management operation portion can include one or more sub-operations (e.g., a bitline precharge sub-operation, a wordline ramp up sub-operation, etc.) performed in connection with the execution of a memory management operation (e.g. a read operation). In an embodiment, the detected voltage parameter level corresponding to each memory management operation portion is encoded to generate encoded information. The encoded information is stored in a log of the memory sub-system 110 (e.g., an encoded information log stored in a volatile memory (e.g., a RAM or SRAM storage location of the controller 115) or a non-volatile memory (e.g., a latch storage area of a memory device 130)).

In an embodiment, the power management component 113 identifies, encodes, and stores encoded information (e.g., voltage parameter level and information identifying an associated memory management operation portion) that corresponds to a peak current draw event (e.g., instances where the memory die draws or consumes a current level that exceeds a peak current draw level threshold). For each memory die, execution of the set of memory management operations results in one or more peak current draw events. The power management component 113 identifies and encodes the information identifying a portion of a memory management operation and the voltage parameter level that correspond to peak current draw event.

During the training phase, each memory die executes multiple memory management operations and a voltage parameter (e.g., voltage droop, etc.) corresponding to respective memory management operation portions is determined. The controller of the memory sub-system can continue to issue the training command sequence to each memory die in turn until all of the memory dies of the memory sub-system complete the training phase.

Following the training phase, the power management component 113 manages the power level consumption by the multiple memory dies during execution of the memory management operations requested by the host system 120. In response to a request for a particular memory die to execute a memory management operation portion, the power management component 113 reads the encoded information corresponding to the requested memory management operation portion and determines the associated voltage parameter level. Using the identified voltage parameter level, the power management component 113 can perform a power management action with respect to the requested memory management operation portion. Example power management actions can include pausing or delaying execution of the requested memory management operation portion, executing the requested memory management operation portion, switching a memory die to a low power mode, etc.)

In an embodiment, the power management component 113 can determine an aggregate or total voltage parameter level currently in the memory sub-system, and determine whether the voltage parameter level associated with the requested memory management operation portion would cause the total voltage parameter level to exceed a total voltage parameter level threshold.

Figure 2:
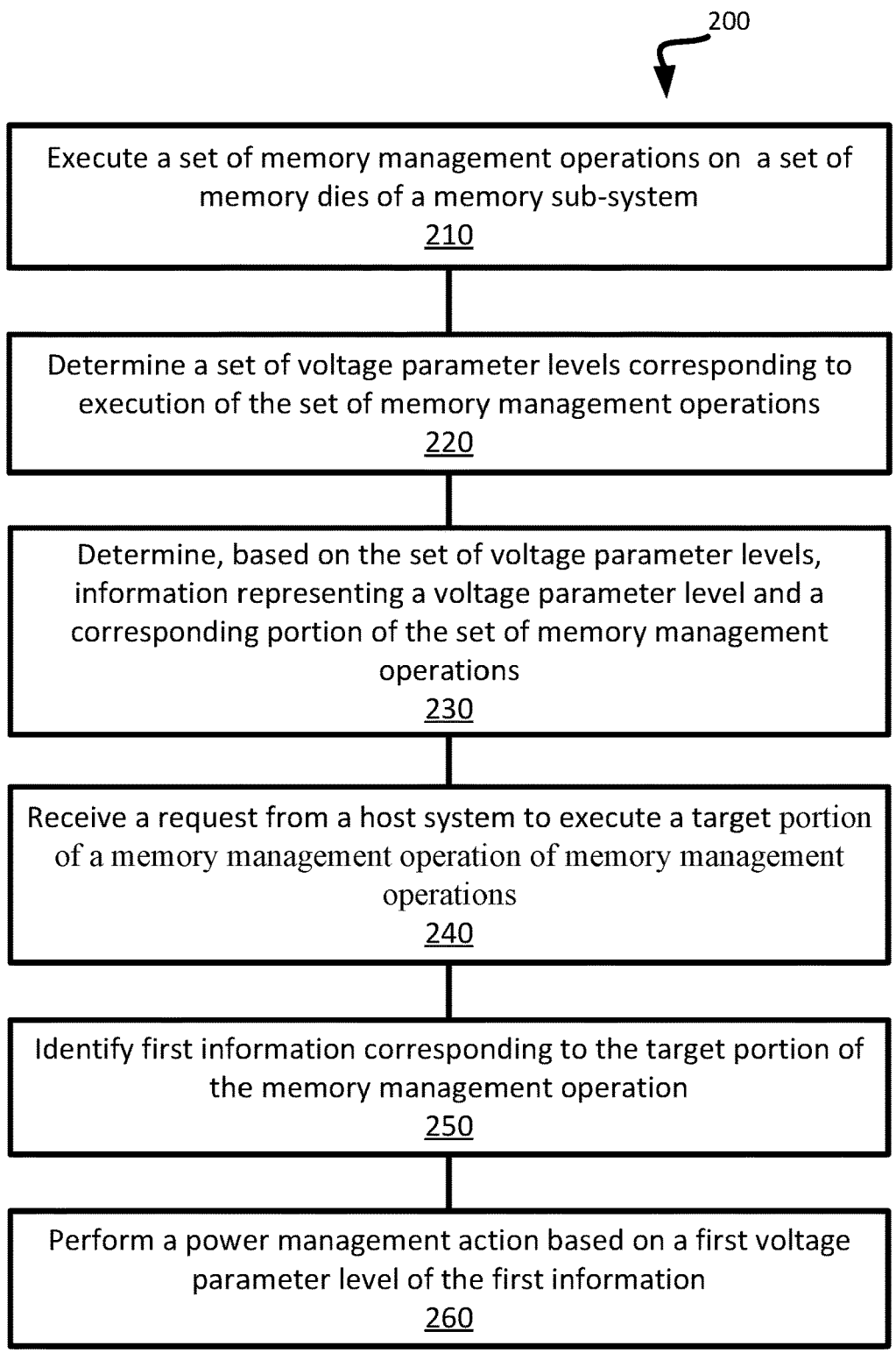
FIG. 2 is a flow diagram of an example method to perform a power management action in view of a voltage parameter level a memory die in accordance with some embodiments.
Figure 3:
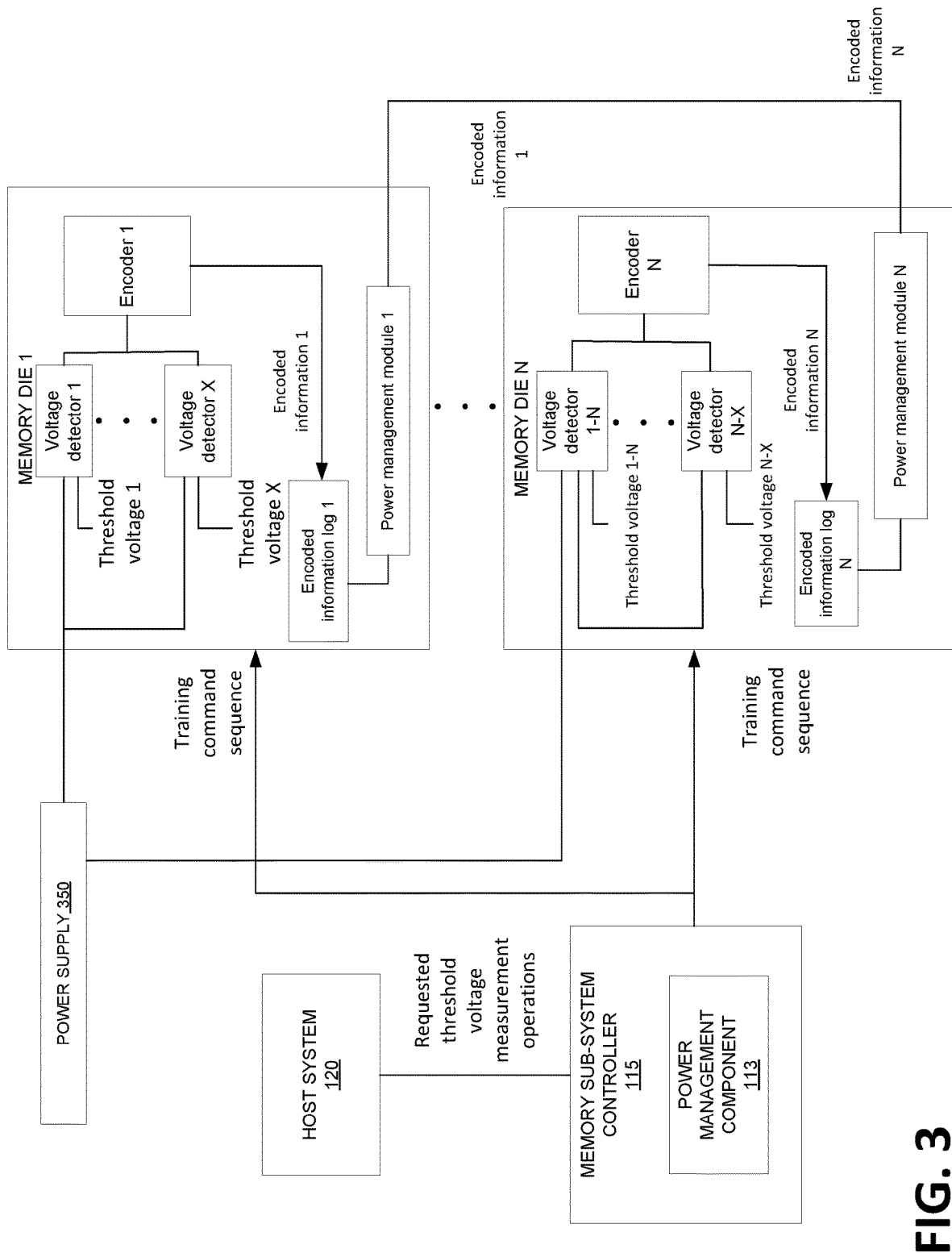
FIG. 3 illustrates an example system including a power management component configured to manage power levels of memory dies in accordance with some embodiments in accordance with some embodiments.

FIG. 2 is a flow diagram of an example method 200 to identify and establish a desired peak power mode configuration for one or more memory dies to be activated concurrently for the execution of one or more operations requested by a host system. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the power management component 113 of FIG. 1. In addition, FIG. 3 illustrates an example memory sub-system 115 including a power management component 113 configured to perform the operations of method 200. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 210, the processing logic executes a set of memory management operations on a plurality of memory dies of a memory sub-system. In an embodiment, the set of memory management operations can include sets of instructions to perform an operation, such as a read operation, a program operation, an erase operation, a power emulation operation, etc. In an embodiment, each respective memory die (e.g., memory die 1 through memory die N of FIG. 3) executes the set of memory management operations which results in the consumption of power (e.g., the drawing of current) from a power supply 350 of the respective memory die for the execution of respective portions (e.g., one or more sub-operations) of each memory management operation.

In an embodiment, the processing logic executes a command for execution of a set of memory management operations by a set of memory dies of a memory sub-system. In an embodiment, the command is initiated and executed during a training phase, during which each memory die of a memory device executes the set of memory management operations.

In an embodiment, a power management component 113 of a memory sub-system controller 115 can initiate the command sequence to enable execution of the multiple memory dies (e.g., memory die 1 through memory die N). In an embodiment, the power management component 113 can issue each training command sequence in turn to each of the memory dies (memory die 1 through N) until all of the memory dies have executed the set of memory management operations. In an embodiment, the power management component 113 can issue a single training command sequence that is sent to each of the memory dies for parallel execution of the set of memory management operations.

At operation 220, the processing logic determines a set of voltage parameter levels corresponding to execution of the set of memory management operations. In an embodiment, a voltage parameter level is detected in response to the execution of respective portions of the set of memory management operations by each of the memory dies of the set of memory dies. In an embodiment, the voltage parameter level can be a voltage droop level for a memory die resulting from the execution of a memory management operation portion.

In an embodiment, as shown in FIG. 3, the memory die may include one or more voltage detector components or circuits (e.g., voltage detector 1 through voltage detector X of memory die 1), each having a respective threshold voltage. The voltage detectors detect can determine the voltage parameter levels associated with the execution of each the memory management operation portions. In an embodiment, the process logic determines a voltage parameter level corresponding to each peak current draw event associated with a memory die (e.g., instances where execution of a memory management operation portion results in a current draw level by the memory die that exceeds a peak current draw threshold level).

At operation 230, the processing logic determines, based on the set of voltage parameter levels, information representing a voltage parameter level and a corresponding portion of the set of memory management operations. In an embodiment, as shown in FIG. 3, an encoder (e.g., encoder 1 of memory die 1) generates encoded information representing a voltage parameter level associated with the execution of a corresponding memory management operation portion. In an embodiment, the encoder generates a token including the encoded or token information and stores the encoded information in an encoded information log (e.g., encoded information log 1 storing the encoded information associated with memory die 1, encoded information log N storing the encoded information associated with memory die N). For example, a first token value of 101 can be generated which encodes a first voltage parameter level associated with the execution of a wordline ramp up sub-operation (e.g., a first memory management operation portion), a second token value of 111 can be generated which encodes a second voltage parameter level associated with the execution of a bitline precharge sub-operation (e.g., a second memory management operation portion), etc. In an embodiment, the encoder generates the encoded information including a voltage parameter level corresponding to respective memory management operation portions. In an embodiment, the encoded information includes the voltage parameter level and associated memory management operation portion that corresponds to an identified peak current draw event. In an embodiment, the encoded information log 1 can be a storage location of the memory die (e.g., a latch storage area of the memory die) or a volatile memory (e.g., RAM or SRAM memory) of the memory sub-system controller 115.

In an embodiment, upon completion of the training phase (e.g., execution of the command sequence by each memory die of the memory sub-system), the encoded information for each memory die is stored and accessible by a power management component (e.g., power management component 1 through power management component N). In an embodiment, the power management components are part of the power management component 113, and configured to access the encoded information logs to read out the stored encoded information (e.g., the stored tokens).

At operation 240, the processing logic receives a request from a host system to execute a target portion of a memory management operation of the set of memory management operations. In an embodiment, the target portion refers to one or more sub-operations of the memory management operation that cause or produce one or more peak currents. The processing logic identifies the target portion (e.g., a high risk portion) of the memory management operation associated with the one or more peak current events for further processing, as described below.

In an embodiment, after completion of the training phase, the power management component 113 operates to manage peak power levels of the memory sub-system during in-system execution of operation requests from a host system 120. In an embodiment, the host system 120 requests the execution of a memory management operation (e.g., a program memory management operation) and the power management component 113 identifies the target portion of the memory management operation to be executed by a memory die of the set of memory die.

At operation 250, the processing logic identifies first information corresponding to the target portion of the memory management operation. In an embodiment, the first information is the encoded information stored that represents the voltage parameter level that resulted from the execution of the target portion of the memory management operation as detected during the training phase. In an embodiment, the power management component 113 executes a peak power management program to establish an optimized level of memory dies that can be activated in parallel in view of an applicable peak power limit (also referred to as a peak power budget) and a voltage parameter level threshold (e.g., a limit or maximize allowable voltage parameter level for the memory sub-system).

At operation 260, the processing logic performs a power management action based on a first voltage parameter level of the first information. In an embodiment, the power management action can include pausing or delaying execution of the target portion of the memory management operation, enabling a memory die to execute the target portion of the memory management operation, switching a memory die to a different power mode.

In an embodiment, the power management component 113 can place a memory die in one of multiple different power modes. For example, a memory die can be placed in a low power mode by setting one or more parameters of a memory die to a first set of values such that a resulting peak power level is below a threshold peak power level. A memory die can be placed in a medium power mode by setting one or more parameters of a memory die to a second set of values such that a resulting peak power level is equal to the threshold peak power level. A memory die can be placed in a high power mode by setting one or more parameters of a memory die to a third set of values such that the resulting peak power level is above the threshold peak power level.

In an embodiment, the power management component 113 can categorize the memory management operation portions in terms of a risk level (e.g., high risk or low risk) as a function of the associated voltage parameter level. For example, the power management component 113 can categorize memory management operation portions having a voltage parameter level that exceeds a voltage parameter level threshold as high risk. In an embodiment, the power management component 113 can identify the requested target portion of the memory management operation represents a high risk portion in view of the associated first voltage parameter level exceeding a voltage parameter level threshold. In an embodiment, a high risk memory management operation portion is identified by determining a voltage parameter level associate with the execution of the memory management operation portion exceeds a voltage parameter level threshold. In an embodiment, the power management component 113 can identify a voltage parameter level of the memory sub-system (e.g., a total voltage parameter level of the currently active memory dies operating in a particular time frame) and determine if execution of the target portion of the memory management operation (as requested by the host system 120) would cause the updated total voltage parameter level (including the first voltage parameter level) to exceed a total voltage parameter level threshold. For example, the power management component 113 can determine that execution of the target portion of the memory management operation by a memory die at a current time would produce a total voltage parameter level to exceed the total voltage parameter level threshold. In response, the power management component 113 can take an appropriate power management action to prevent the condition from occurring (e.g., the total voltage parameter level from exceeding the voltage parameter level threshold), such as delaying the execution of the target portion of the memory management operation by the memory die or switching the memory die into a low power mode.

In an embodiment, the power management component 113 can identify the encoded information associated with the one or more memory management operation portions that corresponded to a peak current draw event. In this embodiment, this encoded information can be identified or encoded as "high risk" or flagged portions that are associated with a corresponding power management action (e.g., delaying or pausing execution or switching to a low power mode).

Figure 4:
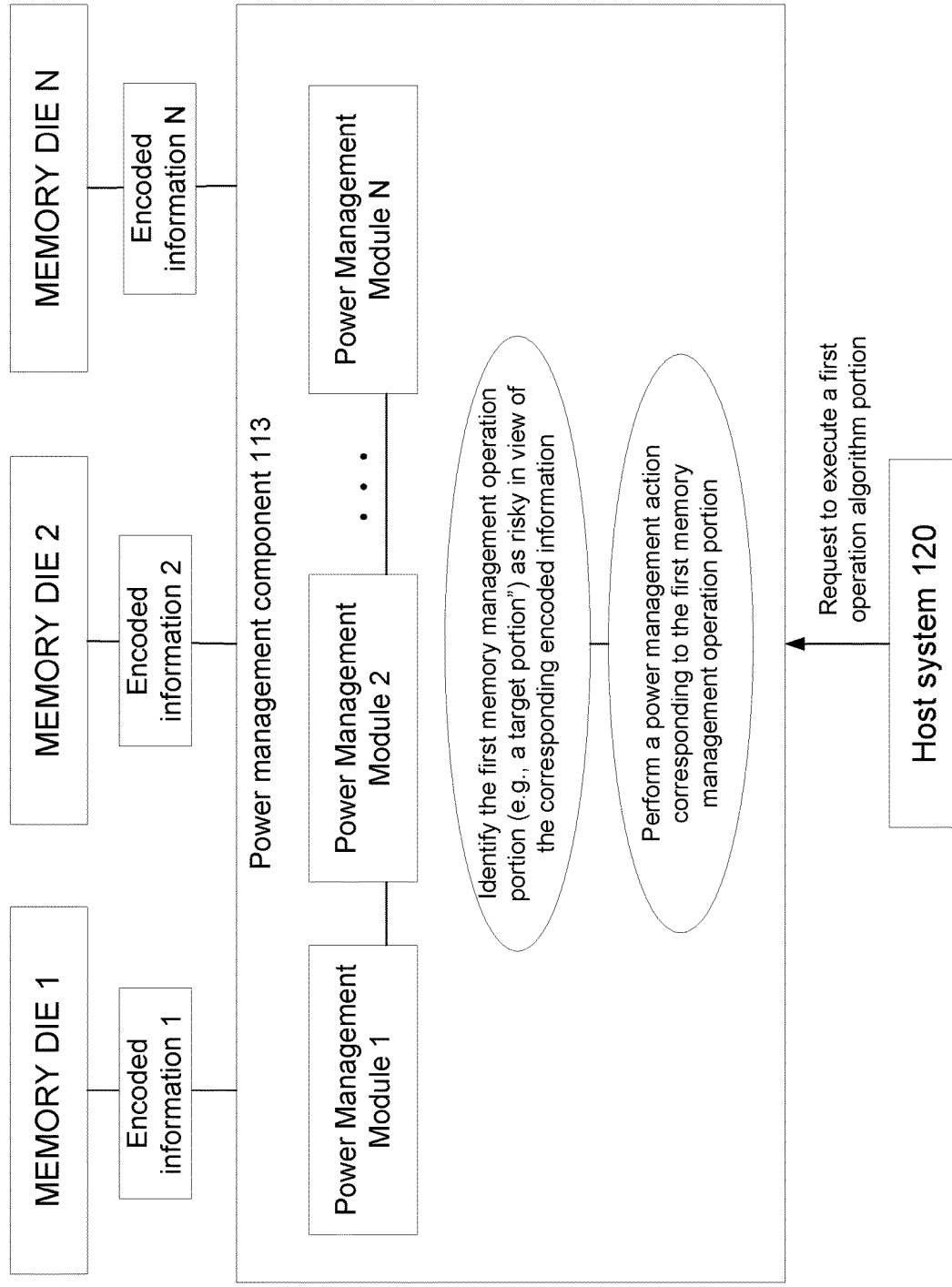
FIG. 4 illustrates an example power management component configured to perform a power management action corresponding to a portion of an operation sequence based on a voltage parameter level in accordance with some embodiments.

As shown in FIG. 3, the encoded information (e.g., encoded information 1, encoded information N) can be shared by the power management modules of the power management component 113 to enable the identification of a power management action in connection with the execution of a requested memory management operation portion. FIG. 4 illustrates a power management component 113 including power management modules (e.g., power management module 1, 2, . . . N) that synchronize or share encoded information (e.g., encoded information 1, encoded information 2, . . . encoded information N) determined during a training phase. In application (e.g., when a host system sends memory management operation requests for execution by one or more memory dies), the power management component 113 can access the encoded information (e.g., a collection of tokens) to enable the power management component 113 to identify high risk memory management operation portions (e.g., portions of the memory management operation that was determined to have a voltage parameter level that exceeded a voltage parameter level threshold during the training phase). For these high risk memory management operation portions (e.g., those having the largest relative voltage droop values), the power management component 113 can perform a power management action, such as delaying execution of the high risk memory management operation portion or switching a memory die into a low power mode for execution of the high risk memory management operation portion.

Figure 5:
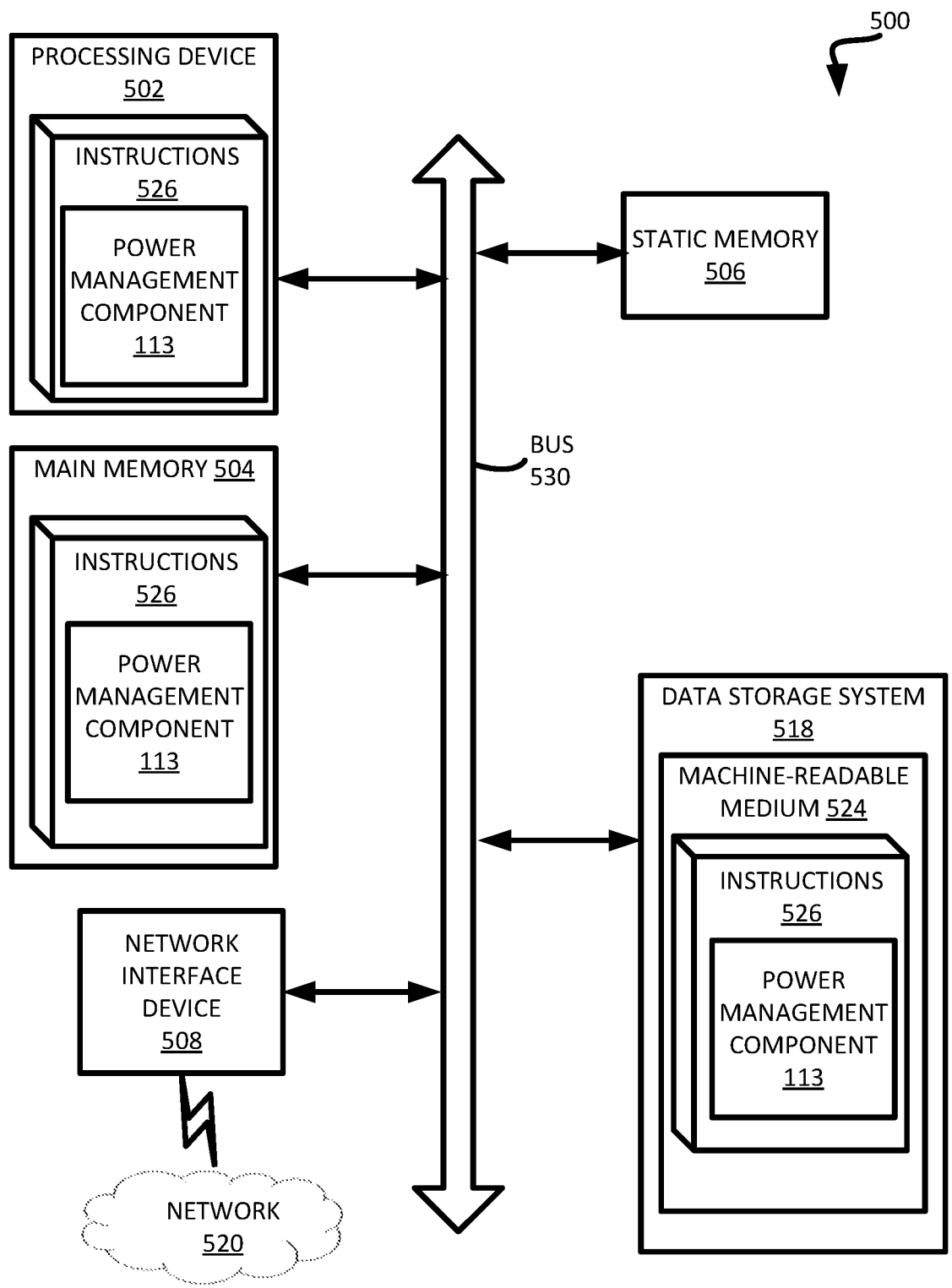
FIG. 5 is a block diagram of an example computer system in which implementations of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a power management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a data protection component (e.g., the power management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving a request from a host system to execute a portion of a memory management operation associated with a memory cell of a plurality of memory cells of one or more memory devices;
identifying a voltage parameter level associated with execution of the portion of the memory management operation;
determining that a comparison of the voltage parameter level with a voltage parameter level threshold satisfies a condition; and
performing, by a processing device, a power management action in response to the condition being satisfied.

2. The method of claim 1, further comprising generating a token corresponding to the voltage parameter level and information identifying the portion of the memory management operation.

3. The method of claim 2, further comprising causing the token to be stored.

4. The method of claim 3, further comprising using the token to identify the power management action.

5. The method of claim 1, wherein the power management action comprises one of delaying execution of the portion of the memory management operation or switching a power mode of a memory die for execution of the portion of the memory management operation.

6. The method of claim 1, further comprising:
determining a total voltage parameter level associated with the one or more memory devices; and
determining a sum of the voltage parameter level and the total voltage parameter level exceeds a total voltage parameter level threshold, wherein the power management action comprises one of delaying execution of the portion of the memory management operation or switching a power mode of a memory device for execution of the portion of the memory management operation.

7. The method of claim 1, wherein the voltage parameter level is identified in response to determining a level of current drawn during execution of the portion of the memory management operation is greater than a current threshold level.

8. The method of claim 1, wherein the voltage parameter level comprises a voltage droop level.

9. A non-transitory computer readable medium comprising instructions, which when executed by a processing device, cause the processing device to perform operations comprising:
executing a set of memory management operations on a memory die of a plurality of memory dies of a memory sub-system;
identifying a voltage parameter level corresponding to execution of a portion of a memory management operation of the set of memory management operations; and storing a token representing the voltage parameter level and information identifying the portion of the memory management operation.

10. The non-transitory computer readable medium of claim 9, the operations further comprising:
determining a level of current drawn during execution of the portion of the memory management operation satisfies a condition, wherein the voltage parameter level is determined in response to the condition being satisfied.

11. The non-transitory computer readable medium of claim 9, the operations further comprising:
identifying, in response to a request from a host system to execute the portion of the memory management operation, the token; and
performing a power management action associated with the token.

12. The non-transitory computer readable medium of claim 11, wherein the power management action comprises one of delaying execution of the portion of the memory management operation or switching a power mode associated a memory die of the plurality of memory dies.

13. The non-transitory computer readable medium of claim 9, wherein the voltage parameter level is determined using one or more voltage detectors.

14. A system comprising:
a memory device comprising a plurality of memory cells; and
a processing device, operatively coupled with the memory device, to perform operations comprising:
receiving a request from a host system to execute a portion of a memory management operation associated with a memory cell of a plurality of memory cells of one or more memory devices;
identifying a voltage parameter level associated with execution of the portion of the memory management operation;
determining that a comparison of the voltage parameter level with a voltage parameter level threshold satisfies a condition; and
performing, by a processing device, a power management action in response to the condition being satisfied.

15. The system of claim 14, the operations further comprising:
generating a token corresponding to the voltage parameter level and information identifying the portion of the memory management operation.

16. The system of claim 15, the operations further comprising causing the token to be stored.

17. The system of claim 16, the operations further comprising using the token to identify the power management action.

18. The system of claim 14, the operations further comprising:
determining a comparison of the voltage parameter level with a voltage parameter level threshold satisfies a condition, wherein the power management action comprises one of delaying execution of the portion of the memory management operation or switching a power mode of a memory die for execution of the portion of the memory management operation.

19. The system of claim 14, the operations further comprising:
determining a total voltage parameter level associated with the one or more memory devices;
determining a sum of the voltage parameter level and the total voltage parameter level exceeds a total voltage parameter level threshold; and
executing the power management action comprises one of delaying execution of the portion of the memory management operation or switching a power mode of a memory device for execution of the portion of the memory management operation.

20. The system of claim 14, wherein the voltage parameter level comprises a voltage droop level.

* * * * *